Oct. 24, 1961   R. C. KVAVLE   3,005,202
EXPLOSIVELY ACTUATED TOOL
Filed Sept. 12, 1957   4 Sheets-Sheet 3
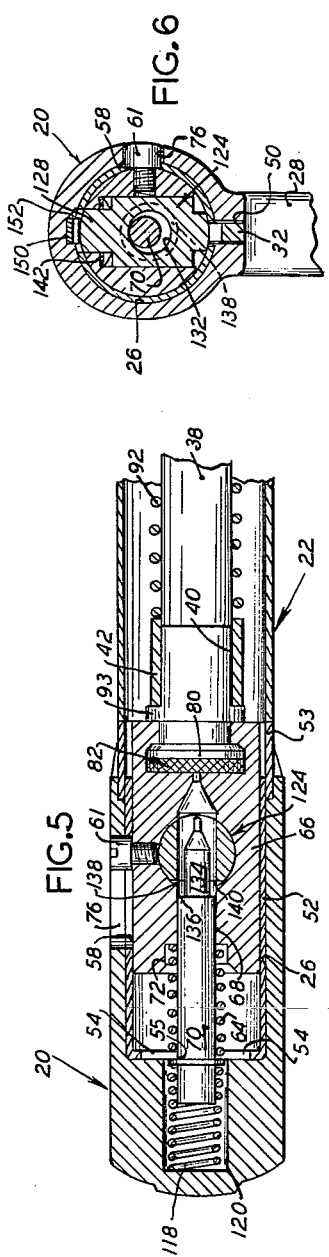
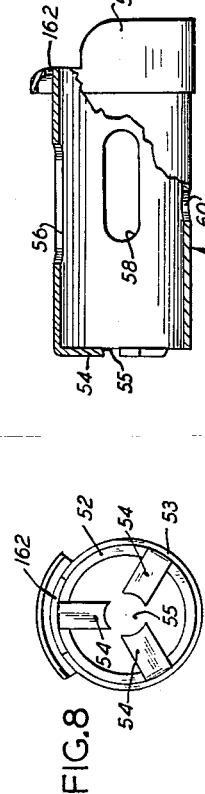
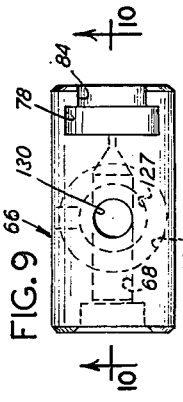
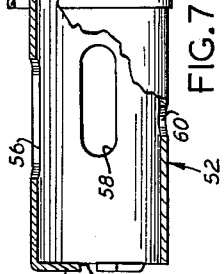
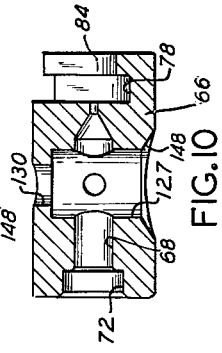
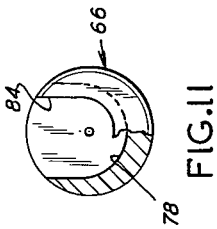
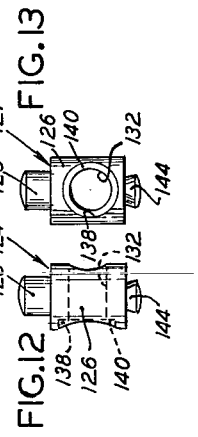
INVENTOR.
ROBERT C. KVAVLE
BY
BUCKHORN, CHEATHAM & BLORE
ATTORNEYS

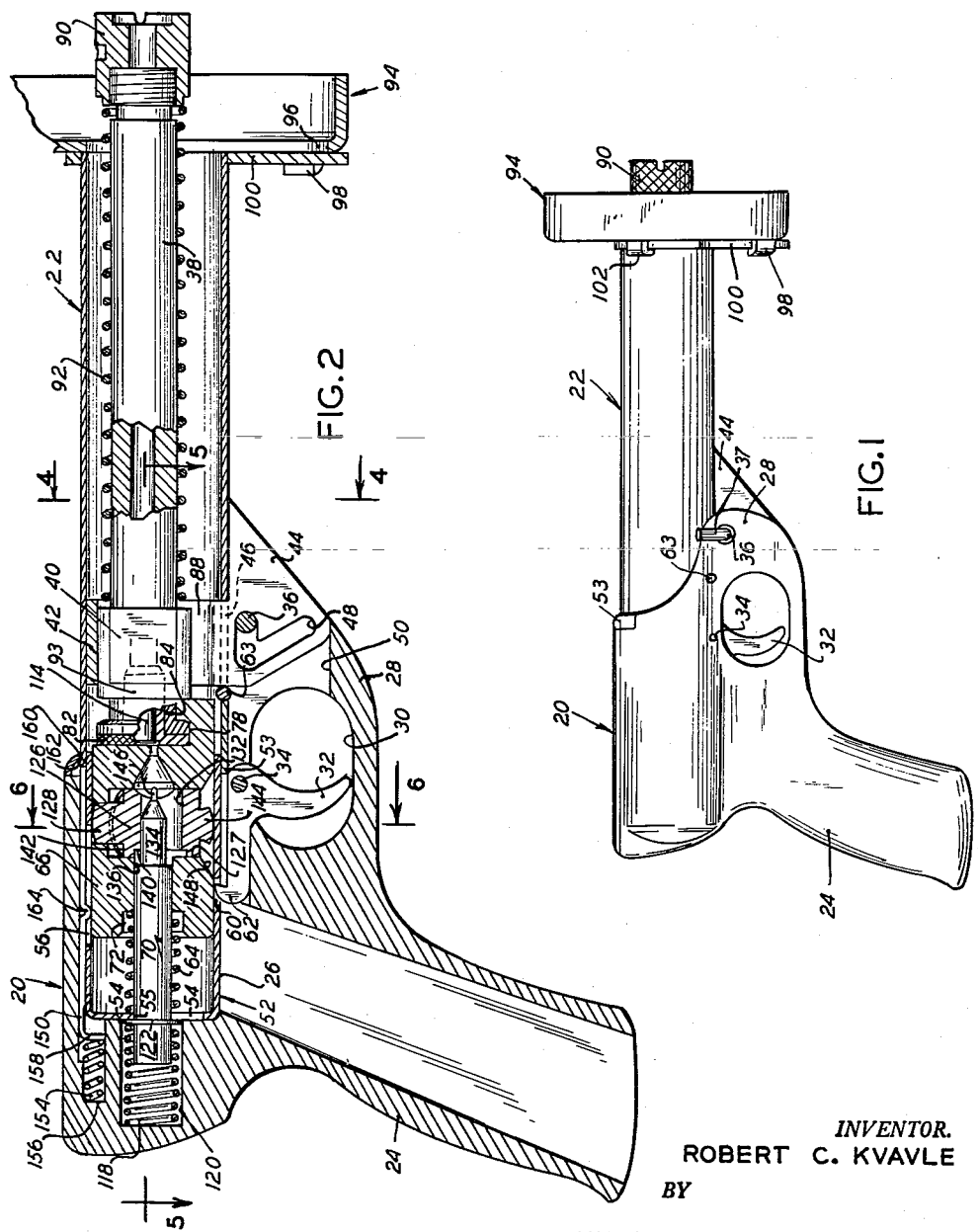

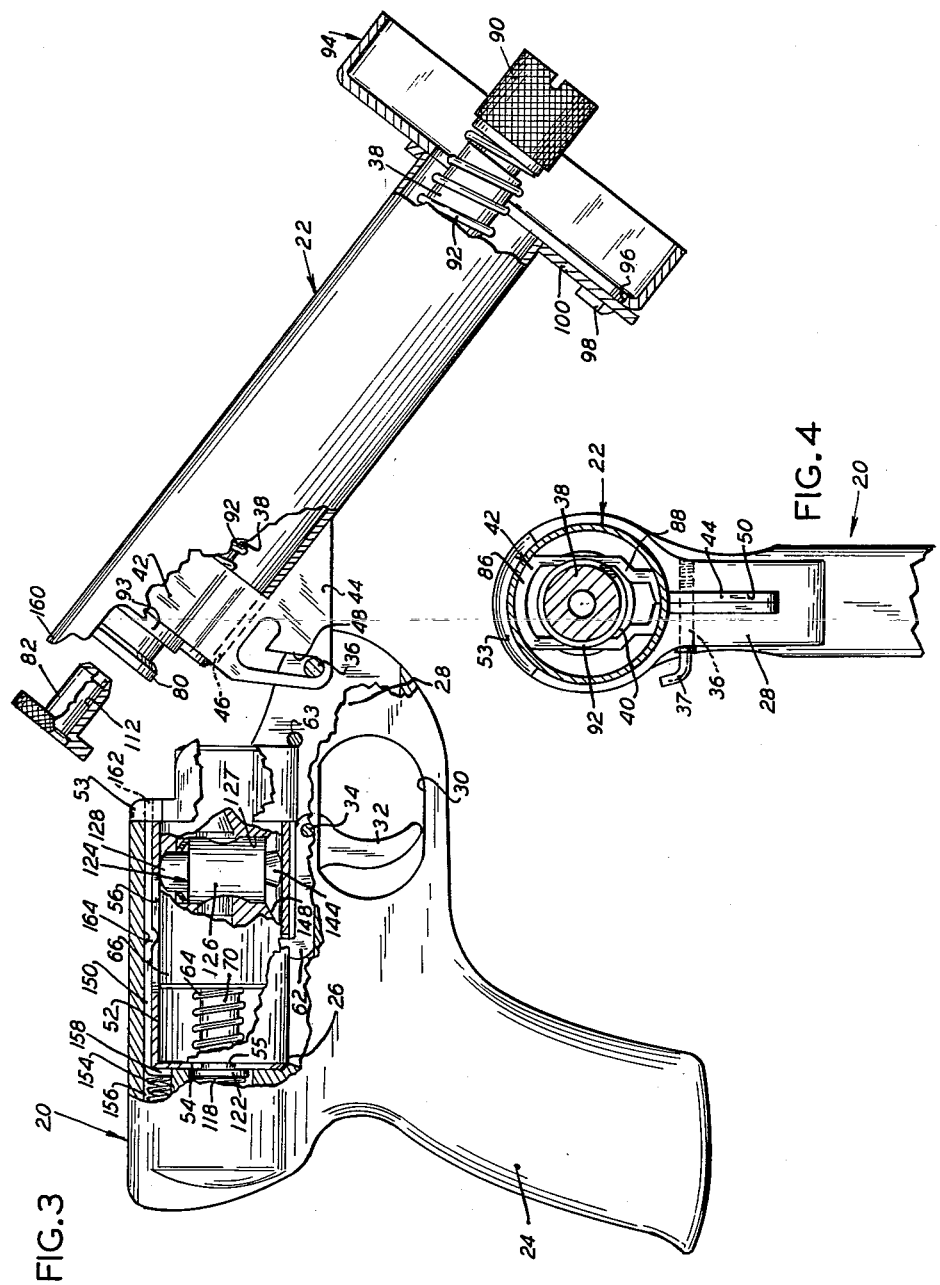

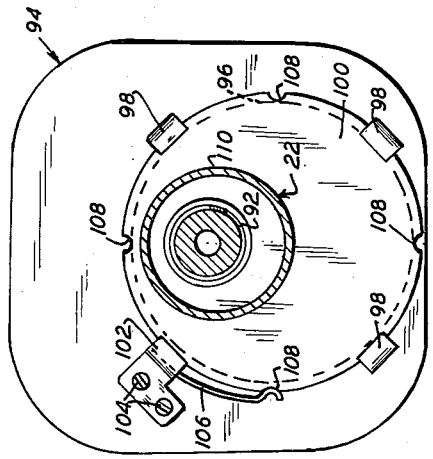
FIG. 17
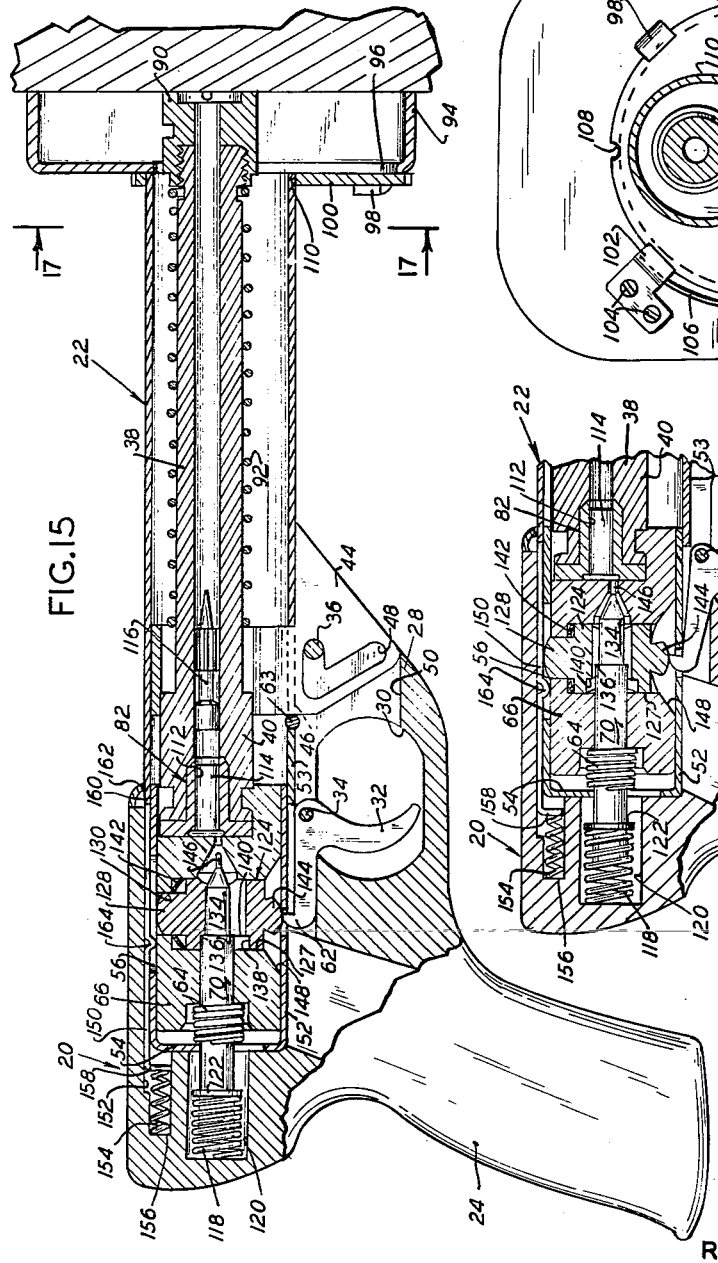
FIG. 15
FIG. 16
INVENTOR.
ROBERT C. KVAVLE
BY
BUCKHORN, CHEATHAM & BLORE
ATTORNEYS 3,005,202
EXPLOSIVELY ACTUATED TOOL
Robert C. Kvavle, Newberg, Oreg., assignor to Omark Industries, Inc., Portland, Oreg., a corporation of Oregon
Filed Sept. 12, 1957, Ser. No. 683,631
14 Claims. (Cl. 1—106)

This invention relates to an explosively actuated tool and more particularly to a tool which is simple in construction and has relatively few parts compared to prior tools but which is rugged in structure, easy for an operator to handle, and embodies safety features rendering it impossible for the tool to be fired except when the tool is pressed against a work piece in proper position relative to such work piece and which otherwise prevent injury of an operator using the tool.

The tool of the present invention has a body portion providing a handle for the tool and also providing an action housing containing a breech block. The tool also has a barrel portion including a barrel housing with a barrel positioned therein. The two housings are pivotally connected together by a laterally extending pivot spaced from the axis of the barrel to provide for opening and closing of the tool. The two housings also have sliding movement relative to each other in a direction perpendicular to the axis of the barrel to enable the barrel in the barrel housing to be connected to the breech block in the action housing by a sliding movement perdendicular to the axis of the barrel during closing of the tool and to enable the barrel to be disconnected from the breech block by a reverse sliding movement during opening of the tool. Both the breech block and the barrel have limited sliding movement longitudinal of their respective housings and are both resiliently urged forwardly of their respective housings. Since the barrel is connected to the breech block when the tool is in closed condition, the barrel is urged forwardly relative to the action housing. The two housings also have sliding motion relative to each other in a direction axially of the barrel and rearward movement of the barrel housing relative to the action housing causes a portion of the barrel housing to engage in a slot in the action housing to lock the barrel housing and barrel contained therein against the reverse disconnecting movement mentioned above. This prevents disconnecting the barrel from the breech block when the tool is in closed condition until the barrel housing is manually moved forwardly with respect to the action housing. The tool can be opened for loading by manually moving the barrel housing forwardly relative to the action housing, then sliding the barrel housing and barrel perpendicularly to the axis of the barrel to disconnect the barrel from the breech block. The barrel housing can then be pivoted relative to the action housing to bring the tool to open condition. A stud to be driven by the tool can then be inserted through the breech end of the barrel and a blank cartridge may then be positioned in a cartridge chamber in a breech plug at the breech end of the barrel. The tool may then be closed as above described, the two engaging portions of the housings providing a camming action moving the barrel housing forwardly relative to the action housing during the perpendicular sliding motion connecting the barrel to the breech block and then allowing the barrel housing to move rearwardly relative to the action housing to lock the tool in closed condition when the barrel has been connected to the breech block.

When the tool is in closed condition, the muzzle end of the barrel normally projects from the front end of the barrel housing. Upon pressing the muzzle end of the barrel against a work piece, the barrel and action housings move forwardly as a unit on the barrel and breech block as a unit. A firing pin positioned in aligned bores in the rear of the action housing and in the breech block is held stationary with respect to the breech block by a sear extending through the breech block perpendicularly to its axis. The firing pin is urged forwardly relative to the action housing by a spring and such spring is energized by the forward movement of the action housing relative to the firing pin and breech block. When the action housing reaches a tool firing position relative to the breech block, a trigger is brought to a position to engage and move the sear perpendicularly of the breech block to release the firing pin. The firing pin is moved forward by its spring to engage the head of the cartridge and fire the tool.

The sear is resiliently urged toward its firing pin engaging position and is in position to be engaged by the trigger only in the firing position of the action housing relative to the breech block. It is possible to move the action housing past the firing position, for example, by a jar if the tool is dropped, in which case the sear cannot be actuated since the action housing is then not in firing position relative to the breech block. In case of such a jar, any possible inertia forces which would drive the action housing from its normal rearward position in the direction of the firing position so as to compress the firing pin spring could not possibly result in inertia forces which would cause the sear to release the firing pin after the firing pin spring has been compressed. Furthermore, inadvertent actuation of the trigger prior to the time the action housing reaches firing position makes it impossible for the action housing to be moved to firing position so that the action housing must be moved to firing position prior to actuation of the trigger and the trigger must thereafter be actuated by the operator of the tool. The barrel housing has a laterally extending safety shield at its muzzle end and the safety mechanisms just described make it impossible to fire the tool unless the safety shield is in engagement with the work piece and the tool is very nearly perpendicular to the surface of the work piece. As a further safety mechanism, the sear is locked against actuation by the trigger to release the firing pin when the barrel housing has been moved forwardly relative to the action housing.

The majority of the elements of the action in the action housing are of circular cross section operating in bores also of circular cross section so that the machining of the action housing and elements therein is largely a matter of boring concentric bores or turning circular parts. Thus, the breech block is of circular cross section positioned in a circular bore in the action housing and has a circular bore therein for receiving a sear which is itself circular in cross section. In addition, the sear has a circular bore for engaging a shoulder on the firing pin and the breech block has a circular bore concentric with its exterior surface for receiving a circular firing pin also extending into a circular bore in the rear portion of the action housing. Since rim fire cartridges are ordinarily used in tools of the general type of the present invention, the firing pin must be eccentric to the bore of the barrel. In accordance with the present invention, the firing pin is concentric with the breech block and also the barrel housing when the tool is in close position, but the barrel is mounted eccentrically in its housing so that the firing pin engages the rim of the cartridge.

The forward or muzzle end of the barrel is spaced from the interior of the barrel housing so that any slight bending or other lateral displacement of the muzzle end of the barrel housing or barrel when the barrel housing and barrel are in engagement with a work piece does not cause binding of the barrel in the barrel housing. When the tool is in the closed position, the barrel is supported by its engagement with the breech block and a guide member secured in the barrel housing adjacent the rear end of the barrel housing, the action housing having a portion extending forwardly under the barrel housing adjacent the guide member so as to provide a rigid support for the barrel housing and the barrel a substantial distance forwardly from the breech block but at a point nearer the breech block than to the muzzle end of the barrel and barrel housing. This structure in conjunction with the engagement of the barrel housing with the action housing when the tool is closed provides an extremely rigid tool during firing operation.

It is therefore an object of the present invention to provide an improved explosively actuated tool of simple and rugged construction.

Another object of the invention is to provide an explosively actuated tool having relatively few parts and in which a breech block, a firing pin and a barrel housing all are of circular form having a common axis and a barrel detachably connected to the breech block is eccentrically mounted with respect thereto when the tool is in closed condition.

Another object of the invention is to provide an improved explosively actuated tool in which the barrel is positioned in a barrel housing but has its muzzle end spaced from such barrel housing and in which the barrel is connected to a breech block when the tool is closed and the barrel housing and the barrel are braced at a point in advance of the breech block.

Another object of the invention is to provide an explosively actuated tool in which a barrel housing is pivotally connected to an action housing and also connected thereto for sliding motion and in which the barrel is connected to or disconnected from a breech block in the action housing by sliding motion perpendicular to the axis of the barrel.

A further object of the invention is to provide an improved explosively actuated tool having safety mechanisms by which accidental discharge of the tool is prevented except when the tool is properly positioned in engagement with a work piece.

A still further object of the invention is to provide an explosively actuated tool in which a barrel positioned in a barrel housing is detachably connected to a breech block positioned in an action housing by a sliding motion perpendicular to the axis of the barrel and disconnection of the barrel from the breech block is prevented by a sliding motion of the barrel housing longitudinally thereof with respect to the action housing.

Other objects and advantages of the invention will appear in the following description of the preferred embodiments shown in the attached drawing of which:

FIG. 1 is a side elevation of the tool of the present invention;

FIG. 2 is a longitudinal vertical section through the tool of FIG. 1 on an enlarged scale with a portion of the safety shield broken away;

FIG. 3 is a side elevation of the tool of FIGS. 1 and 2 on the same scale as FIG. 2 shown with the tool in the open position and with parts broken away to illustrate internal structure;

FIG. 4 is a transverse vertical section taken on the line 4—4 of FIG. 2;

FIG. 5 is a partial horizontal section taken on the line 5—5 of FIG. 2;

FIG. 6 is a partial transverse vertical section taken along the line 6—6 of FIG. 2;

FIG. 7 is a side elevation of the action housing sleeve of the tool of the present invention with portions broken away;

FIG. 8 is an end elevation of the sleeve of FIG. 7 looking toward the right in FIG. 7;

FIG. 9 is a plan view of the breech block of the tool of the present invention;

FIG. 10 is a longitudinal vertical section of the breech block of FIG. 9 taken on the line 10—10 of FIG. 9;

FIG. 11 is an end elevation of the breech block of FIG. 9 looking toward the left in FIG. 10 with a portion broken away;

FIG. 12 is a side elevation of the sear of the tool of the present invention;

FIG. 13 is a rear elevation of the sear of FIG. 12 looking toward the right in FIG. 12;

FIG. 14 is a bottom view of the sear shown in FIGS. 12 and 13;

FIG. 15 is a view similar to FIG. 2 showing the tool in firing condition;

FIG. 16 is a partial view similar to FIG. 15 showing the position of the parts of the tool after firing; and FIG. 17 is a transverse vertical section of the tool taken on the line 17—17 of FIG. 15.

Referring more particularly to FIGS. 1 and 2 of the drawing, the tool of the present invention includes an action housing 20 and a barrel housing 22. The action housing is preferably a casting having a downwardly extending hollow handle portion 24 and a housing portion having a bore 26 therein for receiving the action of the tool later described. The action housing 20 also has a bracing portion 28 providing a finger aperture 30 in which is mounted a trigger 32 on a pivot 34. A pivot 36 for connecting the barrel housing 22 to the action housing 20 is also screw-threaded into the bracing portion 28, the pivot 36 having an inclined end portion 37 positioned exteriorly of the bracing portion 28 of the action housing.

The barrel housing 22 contains a barrel 38 which has a vertically enlarged guide portion 40 also shown in FIG. 4 adjacent its rearward end which is received in a guide member 42 secured in the barrel housing 22. The guide member has a connecting portion 44 extending through a slot 46 (FIG. 1) in the lower rear portion of the barrel housing 22 and then downwardly from the barrel housing. Such connecting portion 44 has a slot 48 therethrough for receiving the pivot 36. The slot 48 has an upper portion extending parallel to the axis of the barrel housing 22 and an inclined portion extending downwardly and forwardly of the tool from the rear part of the upper portion of the slot. The connecting portion 44 of the guide member 42 is positioned in a vertically and longitudinally extending slot 50 in the bracing portion 28 of the action housing. The upper portion of the trigger 32 is also positioned in a rearwardly extending portion of such slot 50. It will be apparent from a consideration of FIGS. 1, 2 and 3, that the slot 48 provides for motion of the barrel housing 22 longitudinally with respect to the action housing 20 as well as motion of the barrel housing 22 upwardly with respect to the action housing 20, and also for pivotal motion of the barrel housing 22 with respect to the action housing about the pivot 36. These three motions are utilized for moving the tool between the closed condition shown in FIGS. 1 and 2 and the open condition shown in FIG. 3.

The bore 26 in the action housing 20 contains an action housing sleeve 52 as shown in FIG. 1. The form of this sleeve is most clearly shown in FIGS. 7 and 8. Such sleeve is open at its forward end and has a tubular extension 53 surrounding and overlapping its forward end. The sleeve extension 53 is secured to the sleeve 52 in any desired manner such as spot welding. The sleeve 52 has its rearward end partially closed by three inwardly bent tangs 54 providing a circular central opening 55. The sleeve 52 also has a slot 56 in its top portion extending longitudinally thereof, and a slot 58 in its side portion also extending longitudinally thereof as well as a circular aperture 60 in its lower portion. As described in more detail later, the slot 56 forms part of the sear locking mechanism of the tool. The slot 58 provides clearance for a locking screw 61 (FIG. 5) which holds a breech block 66 in position while enabling sliding motion of the breech block in the sleeve 52 and the aperture 60 provides access of an actuating portion 62 of the trigger 32 into the interior of the sleeve 52. The sleeve 52 has its rearward end abutting against the rearward end of the bore 26 and is held in such position by a pin 63 extending laterally through the action housing 20 in engagement with the forward edge of the lower portion of the extension 53 of the sleeve. A spring 64 having one end engaging the tangs 54 and its other end engaging the breech block 66 urges the breech block forwardly in the sleeve 52.

The details of the breech block 66 are shown in FIGS. 2, 5 and 9 to 11 inclusive. Such breech block is of cylindrical form and has an external diameter providing a sliding fit in the internal diameter of the action housing sleeve 52. The breech block 66 is provided with an axial bore 68 for receiving the forward end of a firing pin 70 and the rearward end of the bore 68 is enlarged at 72 to provide a seat for the forward end of the spring 64. The spring 64 thus urges the breech block 66 forwardly and such breech block is held within the sleeve 52 against the action of the spring 64 by the screw 61 (FIG. 5) screw-threaded into the side of the breech block 66 and having an enlarged head slidable in the slot 58 of the sleeve 52 and also in a registering slot 76 in a side wall of the action housing 20. It will be apparent that the breech block 66 has limited axial sliding motion in the action housing sleeve 52 determined by the length of the slots 58 and 76 in the sleeve 52 and action housing 20 respectively. The slots are of sufficient length to enable the breech block to engage the tangs 54 forming the rearward end of the sleeve 52. The forward position of the breech block 66, shown in FIGS. 2 and 5, relative to the sleeve 52 or as conversely stated, the rearward position of the action housing relative to the breech block will be referred to as the tool opening or closing position, whereas the intermediate position of the breech block 66 shown in FIGS. 15 and 16 relative to the sleeve 52, in which the rear end of the action housing is adjacent but spaced from the rearward end of the sleeve 52, or as conversely stated the action housing and sleeve 52 are in forward position relative to the breech block, will be referred to as the firing position of the breech block.

The forward end of the breech block 66, as most clearly shown in FIGS. 9 to 11 inclusive, is provided with a U-shaped slot 78 extending downwardly from the upper surface thereof. Such slot receives an enlarged portion or shoulder 80 (FIGS. 2 and 5) on the rear end of the barrel 38 and also receives the head of a removable breech plug 82. The details of the breech plug 82 are shown most clearly in FIG. 3 in which the breech plug is shown removed from the barrel 38. The shoulder 80 of the barrel and the head of the breech plug 82, when the breech plug is in position in the rear end of the barrel, are inserted into the slot 78 in the forward end of the breech block by a motion perpendicular to the axis of the breech plug. The extreme forward end of the breech block 66 has a second U-shaped slot 84 of lesser width and depth than the U-shaped slot 78. The second U-shaped slot 84 fits around the external surface of the barrel 38 adjacent the shoulder 80 thereon and forms a shoulder cooperating with such shoulder 80 for retaining the barrel against endwise movement relative to the breech block 66. The barrel may thereby be detachably connected to the breech block by a motion perpendicular to the axis of the breech block and barrel.

The barrel 38 is mounted for longitudinal sliding motion within the barrel housing 22. That is to say, the guide member 42 is formed of a single piece of metal to provide an upper loop portion 86 (FIG. 4) surrounding and fitting the guide portion 40 of the barrel 38. The loop portion 86 of the guide member provides shoulder portions 88 spaced upwardly from the lower portion of the barrel housing 22 so that the barrel 38 is mounted eccentrically in the barrel housing 22. The barrel housing 22 is concentric with the breech block 66 when the tool is in closed position, which means that the barrel is positioned eccentrically with respect to the breech block 66 when the rear end of the barrel fits in the slots 78 and 84 in the breech block.

The lower ends of the guide member 42 for the barrel are in engagement with each other to form the connecting portion 44 of the guide member which projects through the slot 46 in the barrel housing 22 and which contains the connecting slot 48 for the pivot pin 36. The connecting portion 44 also extends forwardly beneath the barrel housing 22 as shown in FIGS. 2 and 3 to reinforce the barrel housing and prevent inadvertent pinching of the fingers of the operator of the tool in the bight between the two housings when the barrel housing is pivoted to open position. The guide member 40 is rigidly secured to the barrel housing 22 in any suitable manner, for example, by spot welding.

The barrel 38 has a retaining nut 90 screw-threaded upon its forward end and a compression spring 92 is positioned between the rearward portion of the nut 90 and forward end of the guide member 42. Such spring 92 thus urges the barrel 38 forwardly with respect to the barrel housing 22 and conversely urges the barrel housing 22 rearwardly with respect to the barrel 38. The guide portion 40 of the barrel has shoulders 93 (FIG. 5) at its rearward end which engage the guide member 42 to prevent the barrel from being moved forwardly from the position shown in FIG. 3 relative to the barrel housing 22. The barrel may be removed for repair or replacement by removing the nut 90 and sliding the barrel rearwardly with respect to the spring 92 and barrel housing 22.

The forward or muzzle end of the barrel housing is provided with a safety pad or shield 94 in the form of a cup member having a flat inner wall provided with an enlarged eccentric circular opening 96. As shown most clearly in FIGS. 3 and 17, the opening 96 is bordered by three permanent lugs 98 which are spaced 90° apart and extend rearwardly from the rear surface of the cup member 94 and then inwardly to embrace the edge of a disc member 100 which forms a closure for the opening 96. The edge of the disc overlaps the outer edge of the opening 96. A fourth removable lug 102 is secured to the rear face of the shield member 94 by means of screws 104 and such lug member 102 has formed integrally therewith a leaf spring 106 which engages the edge of the disc 100 and has a detent end for engaging in spaced notches 108 in the periphery of the disc 100. The disc 100 has an eccentric aperture 110 which fits over the muzzle end of the barrel housing 22 and is secured thereto in any desired manner, for example, by spot welding. It will be apparent that the shield member 94 is rotatable upon the disc 100 and since the disc is eccentrically disposed with respect to both the barrel housing 22 and the safety shield 94, rotation of the safety shield on the disc 100 will move the shield member from the concentric position with respect to the barrel housing shown in FIG. 17 to an eccentric position in which one edge of the shield member is closely adjacent the periphery of the barrel housing 22 or will move the shield to an intermediate position. This enables the tool to be positioned close to a wall or other obstruction as is well known in the art, although the tool will normally be employed with the shield member 94 in its concentric position shown in FIG. 17. It is apparent that removal of the lug 102 enables the shield to be removed from the barrel housing for replacement or repair.

The breech plug 82 shown most clearly in FIG. 3 is received in a counter bore in the breech end of the barrel as shown most clearly in FIG. 15. The breech plug 82 is provided with a chamber 112 for receiving a blank cartridge 114 which may be fired to drive a stud 116 shown in FIG. 15 as being positioned in the bore of the barrel. It will be apparent that the firing pin 70 is positioned to strike the rim of the head of cartridge 114 when the breech block 66 is in the firing position of FIG. 15 and the firing pin is released.

The firing pin 70 is urged forwardly of the tool by means of a firing pin spring 118 positioned in a bore 120 in the rear end of the action housing 20, the bore 120 being smaller than the bore 26 receiving the action housing sleeve 52 but being concentric with such bore 26. The spring 118 has one end engaging the bottom of the bore 120 and its other end engaging a collar 122 on the firing pin 70 adjacent but spaced from its rear end. The collar 122 is positioned to engage the inwardly directed tangs 54 on the rear end of the action housing sleeve 52 about the opening 55 through which the firing pin extends. It will be apparent that the collar 122 acts as a stop to prevent motion of the firing pin 70 forwardly from the position shown in FIG. 2. In such figure the breech block 66 is in its forward or gun opening or closing position and it is apparent that the firing pin 70 cannot reach the rim of the cartridge 114 when the breech block 66 is in such position.

As stated above, the breech block 66 and barrel 38 are slidable as a unit rearwardly of the tool from their tool opening or closing position when the tool is in closed condition shown in FIG. 2. The breech block 66 contains a sear 124, which as shown in FIGS. 12 to 14, is of cylindrical form with its axis perpendicular to the axis of the breech block. The sear has a central body portion 126 fitting within a circular bore 127 in the breech block 66, as shown in FIGS. 2 and 5, the bore 127 being shown most clearly in FIG. 10. The sear 124 also has an upwardly extending cylindrical portion 128 concentric with the body portion 126 and extending upwardly through a smaller circular bore 130 in the breech block concentric with the bore 127. In the forward or tool opening and closing position of the breech block 66 shown in FIG. 2, the upwardly projecting portion 128 of the sear 124 engages the upper portion of the action housing sleeve 52 forwardly of the slot 56 therein so that the sear 124 cannot be moved upwardly past the position shown so long as the breech block 66 is in its forward position. The sear 124 is provided with a circular bore 132 extending transversely of the sear but longitudinally of the tool, such bore being slightly larger in diameter than the diameter of the body portion of the firing pin 70. The firing pin 70 has a front portion 134 of smaller diameter than the internal diameter of the bore 132 and also of smaller diameter than the body portion of the firing pin to provide a shoulder 136 between the body portion of the firing pin and the front portion 134. The sear 124 also has a rearwardly facing circular counter bore portion 138 of larger diameter than the body of the firing pin 70, such counter bore portion being concentric with the bore 132. The counter bore portion 138 thus provides a shoulder 140. In the position of the parts shown in FIG. 2, the forward portion 134 of the firing pin 70 engages the upper surface of the bore 132 to prevent downward motion of the sear 124, such sear being urged downwardly by a spring member 142 in the form of a curved washer of resilient material. Upon forward motion of the action housing 20 relative to the breech block 66, the shoulder 136 of the firing pin 70 engages the shoulder 140 on the sear 124 to prevent forward motion of the firing pin with the action housing. Continued movement of the action housing forwardly carries the action housing to the firing position shown in FIG. 15 and it will be noted that the firing pin spring 118 has been compressed to condition the firing pin for firing operation.

The sear 124 has a lower poriton 144 of lesser diameter than the body portion 126 and in the firing position shown in FIG. 15, the lower portion 144 is positioned directly above the actuation portion 62 of the trigger 32. In the tool opening and closing position shown in FIG. 2, the activating portion 62 of the trigger is displaced longitudinally of the tool from the lower portion 144 of the sear so that the trigger is ineffective in the tool opening and closing position. In the firing position shown in FIG. 15, the action housing has been moved forwardly until the upwardly extending portion 128 of the sear 124 aligns with the central portion of the slot 56 in the upper portion of the action housing sleeve 52 so that the sear 124 is conditioned for upward movement by the actuating portion 62 of the trigger. Rearward motion of the trigger 32 in the position of the tool shown in FIG. 15 produces upward movement of the actuating portion 62 thereof to produce upward motion of the sear 124 to release the shoulder 140 of the sear 124 from the shoulder 136 of the firing pin 70. That is to say, the sear 124 is moved to the position shown in FIG. 16 and the firing pin 70 is driven forward by the spring 118 from the position shown in FIG. 15 to that shown in FIG. 16. The firing pin 70 has at its forward end a pointed portion 146 which can extend through a small bore in the forward end of the breech block 66 into engagement with the rim of the head of the cartridge 112 to thus fire the tool.

The breech block 66 has an outwardly tapered counter bore 148 in its lower portion in alignment with the bore 127 receiving the body portion of the sear 124 and it will be apparent from a consideration of FIGS. 2 and 15 that premature actuating of the trigger 32 during movement of the action housing 20 from its gun opening and closing position shown in FIG. 2 to the firing position shown in FIG. 15, will cause the hook shaped sear actuating portion 62 of the trigger to engage the lower portion 144 of the sear 124 to prevent further forward movement of the action housing. Preferably the lower portion 144 is under cut as shown in the figures and the actuating portions 62 of the trigger 32 is also undercut so that there is a positive locking of the action of the tool until the action housing is allowed to move slightly rearwardly. This insures that premature firing of the tool does not take place when the action housing moves toward the front of the tool if the operator inadvertently actuates the trigger during such movement. That is to say, the trigger must be actuated as a separate motion after the action housing of the tool reaches firing position. It will also be apparent that the tapered counter bore 148 acts to cam the trigger from the actuated position of FIG. 16 back to the inactive position of FIG. 2 when the action housing 20 is again returned rearwardly of the tool by the spring 64.

The action housing 20 also contains a safety or locking bar 150 positioned in a slot 152 running longitudinally of the action housing at the upper portion of the bore 26 receiving the action housing sleeve 52. The safety bar 150 is slidable longitudinally of the tool and is urged forwardly of the tool by a spring 154 positioned in a bore 156 extending parallel to the bore 120 receiving the firing pin spring 118. The bore 156 intersects the edge of the bore 26 and the locking bar 150 has a bent over portion 158 engaged by the spring 154 and also engaging the rear end of the action housing sleeve 52 when urged to its forward position by the spring 154.

The barrel housing 22 at its upper rear end has a projecting tang 160 best shown in FIG. 3. As shown in FIG. 2, the tang 160 projects through a slot 162 in the action housing sleeve extension 53 when the tool is in the closed position shown in FIG. 2. The slot 162 is shown most clearly in FIGS. 7 and 8. When the tool is in the closed position of FIG. 2, tang 160 engages the forward end of the locking bar 150 to move its rearwardly with respect to the action housing to the position shown in FIG. 2. This is the same position of the locking bar shown in FIG. 15 in which the tool is in closed position and the action is in firing position and it will be noted that the upper projecting portion 128 of the sear 124 has room to move upwardly in front of a downwardly directed projection 164 on the locking bar 150. When the barrel housing 22 is moved forwardly of the tool, however, for example, preparatory to opening the tool or by erroneous handling of the tool by the operator of the tool during an attempted firing operation, the projection 164 of the locking bar 150 moves forwardly of the tool so that the sear 124 cannot be moved upwardly by the trigger 32. That is to say, the projection 164 of the bar 150 moves forwardly to occupy the portion of the slot 56 through which the upper portion 128 of the sear 124 moves during firing of the tool, such position of the projection 164 being shown in FIG. 3. Thus when the barrel housing 22 as been moved forward, relative to the action housing, there is no possible way of moving the sear from its locking position even though the action housing were somehow moved to firing position relative to the breach block, for example, by connecting a barrel to the breech block in the absence of a barrel housing surrounding the barrel to release the firing pin. That is to say, the tool cannot be fired with the locking tang 160 of the barrel housing removed from the slot 162.

In operation of the tool, the tool is loaded when it is in open position shown in FIG. 3. A blank cartridge 114 (FIG. 15) is first inserted in the bore 112 of the breech plug 82 of FIG. 3 either before or after the breech plug is inserted in the counter bore at the rear or breech end of the barrel 38. The barrel portion of the tool, including the barrel housing 22, is then pivoted in a counterclockwise direction in FIG. 3 about the pivot 36 to bring the barrel housing into a position in which the axis of the barrel housing is parallel to the axis of the action housing and to bring the rear end of the barrel, including the rear shoulder 80 thereof and head of the breech plug 82, above the slot 78 in the breech block 66, such slot 78 being shown in FIGS. 2, 9, 10 and 11. The barrel housing 22 is then pressed downwardly with respect to the action housing 20 so that the shoulder 80 and head of the breech plug 82 enter the slot 78. During the downward travel of the barrel housing 22 with respect to the action housing as the parts referred to proceed into the slot 78, the barrel housing 22 is cammed forwardly by the inclined lower portion of the slot 48 so as to compress the spring 92 in the barrel housing 22 and during the latter part of such movement, the tang 160 (FIG. 3) of the barrel housing 22 engages the upper curved portion of the extension 53 of the action housing sleeve 52 so as to also cause the barrel housing to be cammed forwardly. When the tang 160 comes into registry with the slot 162 in the sleeve extension 53, the pivot 36 between the two housings comes into alignment with the upper portion of the slot 48 and the spring 92 causes the barrel housing 22 to move rearwardly with respect to the barrel 38 and the action housing 20. The barrel housing 22 is thereby locked against reverse upward movement relative to the action housing and the shoulder 80 on the barrel and head of the breech plug 82 are locked in the slot 78.

The engagement of the tang 160 with the forward end of the sear locking bar 150, when such tang enters the slot 162, causes rearward movement of such bar against the action of the spring 154 to condition the tool for firing. In the rearward position of the action housing shown in FIG. 2, the firing pin cannot reach the head of the cartridge 114 even if the sear 124 were somehow actuated to release the firing pin.

To fire the tool, the nut 90 on the muzzle end of the barrel 38 must be first pressed against a work piece to cause the action housing 20 and the barrel housing 22 as well as the safety shield 94 to move forwardly with respect to the barrel and breech block. Movement of the action housing forwardly with respect to the barrel 38 moves the action housing sleeve over the rearward end of the barrel so that the barrel is locked in position in the breech block. Continued forward movement of the action housing and the barrel housing until the muzzle end of the safety shield 94 is substantially flush with the muzzle end of the nut 90 carries the action housing of the tool to the firing position shown in FIG. 15. Under these conditions, the actuating portion 62 of the trigger 32 is positioned directly below the lower portion of the sear and the slot 56 in upper portion of the action housing sleeve is positioned so that the upper portion of the sear can enter the central portion of the slot 56 forwardly of the downwardly directed projection 164 on the sear locking bar 160. The tool has to be nearly perpendicular to the work surface in order to move the action housing 20 to a position in which the sear 124 can be actuated by the actuating portion 62 of the trigger 32. That is to say, an inclination of the tool from the vertical by a small angle such as 5° to 10° will allow the breech block 66 to be moved forwardly of the tool by the spring 64 a sufficient distance that the actuating portion 62 of the trigger 32 can no longer engage the lower portion 144 of the sear. During the pressing of the muzzle end of the barrel against the work surface by the operator exerting force on the handle portion 24 of the action housing 20, an eccentric load is exerted between the barrel and action housing tending to pivot the barrel about a laterally extending axis with respect to the housing. The bracing portion 28 of the action housing extending forwardly under the guide member 42 for the barrel in the barrel housing 22 in conjunction with the spaced connection between the barrel housing and action housing provided by the tang 160 of the barrel housing entering the slot 162 in the action housing sleeve minimizes the stresses produced in the various elements by such eccentric load.

In the firing position shown in FIG. 15, the sear 124 is urged toward its lower firing pin locking position shown in figure by the spring washer 142 and in such position the shoulder 140 of the sear 124 engages the shoulder 136 of the firing pin 70. During movement of the action housing 20 from the tool opening or closing position of FIG. 2 to the firing position of FIG. 15, the firing pin is held stationary by the sear and the result is to compress the spring 118. Upon actuating the trigger 32 to cause its actuating portion 62 to move the sear 124 upwardly against the action of the spring washer 142, the shoulder 140 of the sear is disengaged from the shoulder 136 on the firing pin 70. The firing pin 70 is then driven forwardly by its spring 118 so that its point 146 strikes the rim of the head of the cartridge 114 to fire the tool. Inadvertent depression of the trigger 32 during such forward movement of the action housing 20 will cause the sear actuating portion 62 of the trigger to engage the lower portion 144 of the sear to prevent the action housing from being moved to firing position. Thus, the trigger must be left in unactuated condition until the action housing does reach the firing position shown in FIG. 15. Then a separate actuation of the trigger must be performed by the operator in order to fire the tool. This prevents unexpected firing of the tool if the operator inadvertently actuates the trigger 32 before the action housing reaches firing position. Upon firing of the tool, the stud 116 is driven out of the barrel 38 and into the work surface.

Upon removing the muzzle end of the barrel assembly from engagement with the work piece, the spring 64 causes the action housing to move rearwardly from the position shown in FIG. 16 to the position in FIG. 2. The firing pin 70 remains stationary with the breech block 66 until the tangs 54 forming the rear portion of the action housing sleeve 52 contact the collar 122 on the firing pin after which the firing pin moves rearwardly with respect to the breech block 66. As soon as the shoulder 136 on the firing pin 70 clears the shoulder 140 on the sear 124, the sear is moved downwardly by the spring washer 142 and continued rearward motion of the action housing 20 brings the action of the tool again to the tool opening or closing position shown in FIG. 2.

To open the tool to remove the spent cartridge and reload the tool, the barrel housing 22 is moved forwardly with respect to the action housing 20 to compress the spring 92 and remove the tang 160 of the barrel housing 22 from the slot 162 in the upper portion of the extension 53 of the action housing sleeve 52. The barrel housing 22 may then be moved upwardly in FIG. 2 relative to the action housing 20 to remove the shoulder 80 of the barrel 38 and the head of the breech plug 82 from the slot 78. During the initial movement of the barrel housing 22 forwadly with respect to the action housing 20, the pivot 36 follows the upper portion of the slot 48 and during upward motion of the barrel housing 22 relative to the action housing 20 the pivot 36 follows the inclined portion of the slot 48. When the pivot 36 reaches bottom of the inclined portion of the slot 48, the shoulder 80 of the barrel 38 and the head of the breech plug 82 are clear of the slot 78 and the barrel housing 22 and the barrel contained therein may be pivoted to the position shown in FIG. 3 relative to the action housing 20.

The breech plug carrying the spent cartridge case may then be manually removed from the breech and of the barrel. The inclined end portion 37 of the pivot 36 may then be employed as a punch to remove the spent cartridge case from the breech plug. Such inclined end 37 can also be employed to unscrew the pivot 36 from the bracing portion 28 of the action housing so that the barrel housing and barrel can be removed or replaced. When the tool is in the open position of FIG. 3, another stud 116 may then be inserted in the breech and of the barrel and pushed downwardly with any suitable instrument to a desired and predetermined position intermediate the length of the barrel. As well known in the art, the position of the stud 116 along the barrel determines the force exerted thereon by a standard explosive charge in the cartridge 114. A fresh cartridge may then be inserted in the breech plug 82 either before or after the breech plug is inserted into the breech end of the barrel and the tool may then be returned to the closed position of FIG. 2 as above described.

Whenever the barrel housing 22 has its tang 160 disengaged from the slot 162, for example, when the tool is in open condition as shown in FIG. 3, or under any other conditions in which the barrel housing 22 may be moved out of the notch, the spring 154 moves the sear locking bar 150 forwardly so that the projection 164 prevents actuation of the sear even if the action housings were in firing position.

The action housing 20 is capable of movement forwardly past the firing position shown in FIG. 15 in which case the projection 164 on the sear locking bar 150 prevents actuation of the sear 124 by the trigger 32 or in any other manner. Thus, if the muzzle end of the barrel is placed against a projection or manually pushed in any manner past the firing position, the action housing is moved forwardly past the firing position such that the tool can no longer be fired. Another possibility of firing of the tool which is prevented is inadvertent firing due to dropping the tool from a substantial height. If the tool should light on its rear end, the inertia of the breech block 66 and barrel 38 can drive the breech block rearwardly of the tool or what is the same thing, cause the action housing to move forwardly relative to the breech block to the firing position. Under these conditions, the actuating portion 62 of the trigger 32 will ordinarily also be projected into the interior of the sleeve 52 to engage the lower portion 144 of the sear 124 and prevent the action housing from reaching firing position. If the action housing does reach firing position, the spring washer 142 for the sear 124 is sufficiently strong to prevent actuation of the sear to released position either by inertia of the sear or of the trigger 32 unless the inertia forces are strong enough to cause the breech block 66 to bottom in the action housing sleeve 52 against the tangs 54 which are backed up by the solid metal of the action housing at the rearward end of the bore 26. This could cause abrupt stopping of the breech block relative to the action housing and such action might be violent enough to cause the sear to move to actuated position because of the inertia of the sear. When the breech block 66 bottoms in the sleeve 52, however, the action housing has traveled past the firing position relative to the breech block such that the sear 124 is locked against actuation to released postion by the projection 164 on the sear locking bar 150. It is apparent that safety structure built in the tool renders it impossible to fire the tool except when the tool is properly positioned in engagement with a work surface.

When the tool is fired with the action housing in its firing position, the recoil drives the barrel and breech block rearwardly in their housings. The only movement of exposed parts is a short rearward movement of the head of the screw 61 (FIG. 5) from a position near the rearward end of the slot 76 to a position nearer the rearward end of the slot and, if desired, the slot 76 and head of the screw 61 may be covered with a removable cover plate (not shown) to protect the hand of the operator of the tool.

It is further apparent that the tool may be easily assembled and disassembled. Removal of the pivot 36 by unscrewing it from the bracing portion 28 of the action housing 20 when the tool is in the open position of FIG. 3 will release the barrel housing 22 from the action housing. Unscrewing of the nut 90 from the front end of the barrel 38 releases the spring 92 and enables the barrel 38 to be moved rearwardly out of the barrel housing. Also removal of the screw 61 shown in FIG. 5 by unscrewing the screw from the breech block 66 enables the breech block and contained sear 124 and also the spring 64 to be moved forwardly out of the action housing. Removal of the pin 63 and the pivot pin 34 for the trigger enables the action housing sleeve 52, the trigger 32 and the remaining parts contained within the action housing to be moved forwardly out of the action housing. The parts may, of course, be assembled in the reverse order.

While I have described the preferred embodiment of the invention, it is to be understood that the details thereof may be varied and that the scope of the invention is to be determined by the following claims.

I claim:

1. A powder actuated tool for driving studs, which comprises a body portion and a barrel portion having relative movement between an open condition and a closed condition of said tool, said body portion including an action housing and a breech block mounted in said action housing, said barrel portion including an elongated barrel housing and a barrel mounted in said barrel housing, said barrel housing having its rearward portion connected to the forward portion of said action housing for limited pivotal movement about an axis extending laterally of the axis of said barrel housing and for relative sliding movement between said housings to provide said relative movement, interengaging means on said breech block and said barrel for connecting said barrel to said breech block by a relative sliding straight line motion in one direction perpendicular to the axis of said barrel, and interengaging means on said housing to lock said barrel and breech block against relative sliding motion in a direction opposite said one direction when said tool is in closed condition.

2. A powder actuated tool for driving studs, which comprises a body portion and a barrel portion having relative movement between an open condition and a closed condition of said tool, said body portion including an action housing having an open forward end and a breech block positioned in said action housing, said barrel portion including an elongated barrel having a breech end and housing and a barrel mounted in said barrel housing, said barrel housing having its rear portion connected to the forward portion of said action housing for limited pivotal movement about an axis extending laterally of the axis of said barrel housing and for relative sliding movement between said housings to provide said relative movement, interengaging means on the forward end of said breech block and the breech end of said barrel for connecting said barrel to said breech block by a relative sliding motion in one direction perpendicular to the axis of said barrel, and interengaging means on said housings engaged by a relative sliding motion of said barrel and action housings in a direction parallel to the axis of said barrel to lock said barrel against sliding motion relative to said breech block in a direction opposite said one direction when said tool is in closed condition.

3. A powder actuated tool for driving studs, which comprises a body portion and a barrel portion having relative movement between an open condition and a closed condition of said tool, said body portion including an action housing having an open forward end, said barrel portion including an elongated barrel housing connected to the forward end of said action housing for limited pivotal and sliding movement between said housings to provide said relative movement between said body portion and said barrel portion, a barrel having a breech end and mounted in said barrel housing for limited sliding motion relative to and in a direction longitudinally of said barrel housing, a breech block mounted in said action housing for limited sliding movement in a direction longitudinally of said action housing, resilient means urging said breech block toward the forward end of said action housing, interengaging means on said breech block and the breech end of said barrel for connecting said barrel to said breech block by a sliding motion in one direction laterally of said barrel when said breech block is at the forward end of said action housing, and interengaging means on said housings engaged by sliding motion of said barrel housing relative to said barrel toward said action housing to lock said barrel against reverse sliding motion relative to said breech block when said tool is in closed condition, and resilient means urging said barrel housing toward said action housing.

4. A powder actuated tool comprising a body portion providing an action housing and a barrel portion having a barrel housing, the forward end of said action housing being open and being connected to the rearward end of said barrel housing for combined sliding and pivotal motion between an open condition and a closed condition of said tool, a breech block in said action housing, said action housing being slidable longitudinally of said breech block, resilient means urging said action housing rearwardly of said breech block, a barrel in said barrel housing having a breech end, said barrel housing being slidable longitudinally of said barrel, interengaging means on the forward end of said breech block and the breech end of said barrel for connecting said barrel to said breech block by a sliding motion in one direction perpendicular to the axis of said barrel, interconnecting means on said action housing and said barrel housing engaged by sliding motion of said barrel housing rearwardly of said barrel to lock said barrel housing and barrel against sliding movement in a direction reverse to said one direction when said tool is in closed condition and resilient means urging said barrel housing rearwardly of said barrel to engage said interconnecting means, said barrel housing and action housing being slidable forwardly as a unit relative to said barrel and said breech block as a unit when said tool is in closed condition to move said action housing to a firing position relative to said breech block.

5. A powder actuated tool comprising a body portion including an action housing having an open forward end and a breech block in said housing, and a barrel portion including a barrel housing having an open rearward end and a barrel in said housing, means connecting said housings for relatively sliding motion of said portions in a direction having a component along a line extending radially of said barrel and for relative pivotal motion of said portions about an axis extending laterally of the axis of said barrel to provide for movement of said portions between an open and closed position of said tool, interengaging means on the forward end of said breech block and the rearward end of said barrel engaged by said relative sliding motion of said portions in one direction for connecting said barrel to said breech block, releasable interconnecting means between the forward end of said action housing and the rearward end of said barrel housing for locking said barrel housing to said action housing to prevent said relative sliding motion between said portions in a direction in reverse to the last mentioned direction to thereby prevent said barrel from being disconnected from said breech block when said tool is in said closed condition, and means for mounting said barrel and said breech block in said housings to provide for sliding said housings as a unit forwardly of said tool when said tool is in closed position to move said action housing to a firing position relative to said breech block and further prevent said relative sliding motion between said portions in said reverse direction.

6. A powder actuated tool comprising a body portion including an action housing having an open forward end and a breech block in said housing, and a barrel portion including a barrel housing having an open rearward end and a barrel in said housing, means connecting said housings for relatively sliding motion of said portions in a direction having a component along a line extending radially of said barrel and for relative pivotal motion of said portions about an axis extending laterally of the axis of said barrel to provide for movement of said portions between an open and closed position of said tool, interengaging means on the forward end of said breech block and the rearward end of the said barrel engaged by said relative sliding motion of said portions in one direction for connecting said barrel to said breech block, releasable interconnecting means between the forward end of said action housing and the rearward end of said barrel housing for locking said barrel housing to said action housing to prevent said relative sliding motion between said portions in a direction in reverse to the last mentioned direction to thereby prevent said barrel from being disconnected from said breech block when said tool is in said closed condition, means for mounting said barrel and said breech block in said housings to provide for sliding said housings as a unit forwardly of said tool when said tool is in closed position to move said action housing to a firing position relative to said breech block and further prevent said relative sliding motion between said portions in said reverse direction, a handle portion extending from said action housing at an angle to the axis of said barrel, said action housing having a bracing portion on the same side of said tool as said handle portion and extending forwardly of said action housing along the outside of said barrel housing a greater distance than on the opposite side of said tool.

7. An explosively actuated tool comprising an action housing and a barrel housing connected together for combined pivotal and sliding motion relative to each other between an open condition and a closed condition of said tool, a breech block in said action housing, a barrel in said barrel housing having a breech end, means interconnecting the forward end of said breech block and the breech end of said barrel, locking means interconnecting said action housing and barrel housing when said tool is in closed condition to hold said tool in closed condition, said barrel housing and action housing having longitudinal sliding motion on said barrel and breech block as a unit, resilient means urging said barrel housing and action housing rearwardly of said tool to project the end of said barrel from the forward end of said barrel housing so that said barrel housing and action housnig can be moved forwardly on said barrel and breech block to a firing position by engagement of said forward end of said barrel against a work piece, a firing pin in said action housing, resilient means urging said firing pin forwardly of said action housing, stop means carried by said action housing for limiting forward motion of said firing pin, a sear carried by said breech block and engaging said firing pin during said forward motion to load said resilient means for said firing pin, means operative only in said firing position of said action housing relative to said breech block for actuating said sear to release said firing pin, and safety means controlled by said locking means and having a portion positioned in the path of said sear to prevent actuation of said sear to release said firing pin if said action housing is moved relative to said breech block to said firing position when said locking means is released.

8. An explosively actuated tool comprising an action housing and a barrel housing connected together for motion relative to each other between a tool opened and a tool closed condition of said tool, a breech block in said action housing, a barrel in said barrel housing having a breech end, means interconnecting the forward end of said breech block and the breech end of said barrel, locking means interconnecting said action housing and barrel housing when said tool is in closed condition to hold said tool in said closed condition, said barrel housing and action housing having forward sliding motion on said barrel and breech block as a unit when said tool is in tool closed condition to move said action housing to a firing position relative to said breech block, a firing mechanism including a firing pin, a firing pin spring and a sear carried by said breech block and engaging said firing pin during said forward sliding motion to load said spring, trigger means operative only in said firing position of said action housing for actuating said sear to release said firing pin, and means for preventing actuation of said sear to release said firing pin if said action housing is moved relative to said breech block to said firing position when said locking means is released.

9. An explosively actuated tool comprising an action housing, a breech block in said action housing, a barrel housing, a barrel in said barrel housing having a breech end, means for connecting the breech end of said barrel to said breech block, means for connecting said barrel housing to said action housing for relative movement of said housings between a tool closed and a tool opened condition, releasable means for latching said housings against said movement when said tool is in said tool closed condition including a latch element having a rearward motion relative to said action housing, a firing mechanism including a sear carried by said breech block, a firing pin engaged by said sear, resilient means urging said firing pin forwardly and trigger means for actuating said sear to release said firing pin, said action housing being movable longitudinally of said tool to position said trigger in firing position relative to said sear, and safety means preventing actuation of said sear by said trigger means to release said firing pin when said tool is in said opened condition and said action housing has been moved to said firing position, said safety means including a member movable in said action housing longitudinally of said tool and resiliently moved to a safety position when said tool is in said opened condition, said safety means having a portion positioned in the path of said sear when in said safety position and being moved by said motion of said latch element to move said portion out of said path when said tool is in said tool closed condition and said action housing is in said firing position.

10. An explosively actuated tool comprising an action housing, a breech block in said action housing, a barrel housing, a barrel in said barrel housing having a breech end, means for connecting the breech end of said barrel to said breech block, means for connecting said barrel housing to said action housing including a latch element having a rearward sliding motion relative to said action housing, a firing mechanism including a sear carried by said breech block, a firing pin engaged by said sear, resilient means urging said firing pin forwardly and trigger means for actuating said sear to release said firing pin, said action housing being movable longitudinally of said tool to position said trigger means in firing position relative to said sear, and safety means preventing actuation of said sear by said trigger means to release said firing pin when said housing is in said opened condition and said action housing has been moved to said firing position, said safety means being disabled by said motion of said latch element when said tool is in said closed condition.

11. A powder actuated tool for driving studs, which comprises a body portion and a barrel portion having relative movement between an open condition and a closed condition of said tool, said body portion including an action housing and a breech block mounted in said action housing, said barrel portion including a barrel housing and a barrel mounted in said barrel housing, means connecting the rearward portion of said barrel housing to the forward portion of said action housing for relative sliding movement of said rearward and forward portions in a direction extending generally perpendicularly to the axis of said barrel to provide said relative movement of said body portion and said barrel portion, interengaging means on said breech block and said barrel interengaged when said body portion and barrel portion are relatively moved in said direction from said open condition to said closed condition of said tool for connecting said barrel to said breech block against relative motion of said breech block and barrel axially of said barrel when said tool is in said closed condition, and disengaged when said body portion and barrel portion are relatively moved from said closed condition to said open conditions of said tool.

12. A powder actuated tool for driving studs, which comprises a body portion and a barrel portion having relative movement between an open condition and a closed condition of said tool, said body portion including an action housing and a breech block mounted in said action housing, said barrel portion including a barrel housing and a barrel mounted in said barrel housing, means connecting the rearward portion of said barrel housing to the forward portion of said action housing for relative sliding movement of said rearward and forward portions in a direction extending generally perpendicularly to the axis of said barrel to provide said relative movement of said body portion and said barrel portion, interengaging means including complementary slots providing shoulders on said breech block and said barrel extending radially of the axis of said barrel interengaged when said body portion and barrel portion are relatively moved in said direction from said open condition to said closed condition of said tool for connecting said barrel to said breech block against relative motion of said breech block and barrel axially of said barrel when said tool is in said closed condition, and disengaged when said body portion and barrel portion are relatively moved from said closed condition to said open conditions of said tool.

13. A powder actuated tool for driving studs, which comprises a body portion and a barrel portion having relative movement between an open condition and a closed condition of said tool, said body portion including an action housing and a breech block mounted in said action housing, said barrel portion including a barrel housing and barrel mounted in said barrel housing, means connecting the rearward portion of said barrel housing to the forward portion of said action housing for relative sliding movement of said rearward and forward portions in a direction extending generally perpendicularly to the axis of said barrel to provide said relative movement of said body portion and said barrel portion, interengaging means on said breech block and said barrel interengaged when said body portion and barrel portion are relatively moved in said direction from said open condition to said closed condition of said tool for connecting said barrel to said breech block against relative motion of said breech block and barrel axially of said barrel when said tool is in said closed condition, and disengaged when said body portion and barrel portion are relatively moved from said closed condition to said open condition of said tool, means supporting said barrel and said breech block in said housings to provide movement of said housings forwardly of said tool relative to said barrel and breech block when said tool is in said closed condition to prevent said barrel portion and body portion being relatively moved to said open condition of said tool and means for firing said tool operative only after said housings have been moved forwardly on said barrel and breech block.

14. A powder actuated tool for driving studs, which comprises a body portion and a barrel portion having relative movement between an open condition and a closed condition of said tool, said body portion including an action housing and a breech block mounted in said action housing, said barrel portion including a barrel housing and a barrel mounted in said barrel housing, means connecting the rearward portion of said barrel housing to the forward portion of said action housing for relative sliding movement of said rearward and forward portions in a direction extending generally perpendicularly to the axis of said barrel to provide said relative movement of said body portion and said barrel portion, interengaging means including complementary slots providing shoulders on said breech block and said barrel extending radially of the axis of said barrel interengaged when said body portion and barrel portion are relatively moved in said direction from said open condition to said closed condition of said tool for connecting said barrel to said breech block against relative motion of said breech block and barrel axially of said barrel when said tool is in said closed condition, and disengaged when said body portion and barrel portions are relatively moved from said closed condition to said open conditions of said tool, said barrel having a removable breech plug in its rearward end and said slot in said breech block having a shoulder engaging said breech plug to hold said breech plug in said end of said barrel when said tool is in said closed condition.

References Cited in the file of this patent

UNITED STATES PATENTS

| | | |
|---|---|---|
| 350,328 | Toggenburger | Oct. 5, 1886 |
| 2,679,645 | Erickson | June 1, 1954 |
| 2,804,620 | Gannon | Sept. 3, 1957 |
| 2,945,236 | Kopf et al. | July 19, 1960 |

FOREIGN PATENTS

| | | |
|---|---|---|
| 213,759 | Switzerland | June 3, 1941 |
| 1,073,314 | France | Mar. 24, 1954 |
| 1,099,225 | France | Mar. 16, 1955 |
| 1,123,658 | France | June 18, 1956 |

UNITED STATES PATENT OFFICE
CERTIFICATION OF CORRECTION

Patent No. 3,005,202                                            October 24, 1961

Robert C. Kvavle

It is hereby certified that error appears in the above numbered patent requiring correction and that the said Letters Patent should read as corrected below.

Column 2, line 62, for "close" read -- closed --; column 5, line 36, for "action housing" read -- breech block --; line 40, for "breech block" read -- action housing --; column 7, line 66, for "poriton" read -- portion --; line 71, for "activating" read -- actuating --; column 8, line 64, for "its" read -- it --; column 9, line 8, for "as been moved forward," read -- has been moved forward --; line 14, strike out "to release the firing pin" and insert the same after "position" in line 10, same column 9; column 10, line 4, for "160" read -- 150 --; line 18, after "the" insert -- action --; same column 10, line 29, after "such" insert -- lower --; column 11, line 5, for "forwadly" read -- forwardly --; lines 16 and 24, for "and", each occurrence, read -- end --; column 12, line 67, strike out "housing and a barrel" and insert the same after "barrel", second occurrence, in line 66, same column 12; column 14, line 69, for "houshig" read -- housing --; column 15, lines 61 and 62, strike out "and said action housing is in said firing position" and insert the same after "position" in line 59, same column 15.

Signed and sealed this 10th day of April 1962.

(SEAL)
Attest:

ERNEST W. SWIDER                                  DAVID L. LADD
Attesting Officer                                  Commissioner of Patents